US010055013B2

(12) United States Patent
Ramaswamy et al.

(10) Patent No.: US 10,055,013 B2
(45) Date of Patent: Aug. 21, 2018

(54) DYNAMIC OBJECT TRACKING FOR USER INTERFACES

(71) Applicant: Amazon Technologies, Inc., Reno, NV (US)

(72) Inventors: Sharadh Ramaswamy, Sunnyvale, CA (US); Jason Robert Weber, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 111 days.

(21) Appl. No.: 14/029,612

(22) Filed: Sep. 17, 2013

(65) Prior Publication Data
US 2015/0077323 A1 Mar. 19, 2015

(51) Int. Cl.
G06F 3/12 (2006.01)
G06F 3/01 (2006.01)
(Continued)

(52) U.S. Cl.
CPC ............ G06F 3/012 (2013.01); G06F 3/0304 (2013.01); G06F 3/04815 (2013.01); G06F 2200/1637 (2013.01)

(58) Field of Classification Search
CPC .......... G06F 3/013; G06F 3/011; G06F 3/017; G06F 1/1626; G06F 2200/1637;
(Continued)

(56) References Cited

U.S. PATENT DOCUMENTS 5,563,988 A 10/1996 Maes et al.
5,616,078 A 4/1997 Oh
(Continued)

FOREIGN PATENT DOCUMENTS

CN 1694045 A 11/2005
JP 2002-164990 6/2002
(Continued)

OTHER PUBLICATIONS

Nokia N95 8GB Data Sheet, Nokia, 2007, 1 page.
(Continued)

Primary Examiner — Olga Merkoulova
(74) Attorney, Agent, or Firm — Pierce Atwood LLP

(57) ABSTRACT

Systems and approaches provide for user interfaces that are based on object tracking. For example, the object may be a user's head or face. As the user moves his head or face and/or tilts a computing device, the content displayed on the computing device will adapt to the user's perspective. The content may include three-dimensional (3D) graphical elements projected onto a two-dimensional (2D) plane and/or the graphical elements can be associated with textural shading, shadowing or reflections that change according to user or device motion to give the user the impression that the user is interacting with the graphical elements in 3D environment. A state of motion of the device can be determined and jitter and/or latency corresponding to the rendering of content can be altered so as to minimize or decrease jitter when the device is stationary and/or to decrease or minimize latency when the device is in motion.

21 Claims, 8 Drawing Sheets

(51) Int. Cl.
*G06F 3/03* (2006.01)
*G06F 3/0481* (2013.01)

(58) Field of Classification Search
CPC .... G06F 3/012; G06F 3/04815; G06F 3/0346; G06F 2203/04802; G06F 1/1686; G06F 3/005; G06F 3/0304; G06K 9/00597; G06K 9/0061; G06K 9/00248; G06K 9/00362; G06K 9/00261; G06K 9/00268; G06K 9/00671; H04N 13/0468; H04N 13/0472; H04N 13/0475; H04N 13/0477
See application file for complete search history.

(56) References Cited

U.S. PATENT DOCUMENTS

| | | | |
|---|---|---|---|
| 5,850,211 A | 12/1998 | Tognazzini | |
| 6,272,231 B1 | 8/2001 | Maurer et al. | |
| 6,301,370 B1* | 10/2001 | Steffens | G06K 9/00228 342/90 |
| 6,385,331 B2 | 5/2002 | Harakawa et al. | |
| 6,392,667 B1 | 5/2002 | McKinnon et al. | |
| 6,434,255 B1 | 8/2002 | Harakawa | |
| 6,750,848 B1 | 6/2004 | Pryor | |
| 6,863,609 B2 | 3/2005 | Okuda et al. | |
| 6,956,566 B2 | 10/2005 | Gelb | |
| 6,959,102 B2 | 10/2005 | Peck | |
| 7,033,025 B2 | 4/2006 | Winterbotham | |
| 7,199,767 B2 | 4/2007 | Spero | |
| 7,301,526 B2 | 11/2007 | Marvit et al. | |
| 7,379,566 B2 | 5/2008 | Hildreth | |
| 7,401,783 B2 | 7/2008 | Pryor | |
| 7,515,173 B2* | 4/2009 | Zhang et al. | 348/14.16 |
| 7,519,223 B2 | 4/2009 | Dehlin et al. | |
| 7,806,604 B2* | 10/2010 | Bazakos | G06K 9/00255 348/153 |
| 8,098,885 B2* | 1/2012 | Zhang | G06K 9/00228 348/169 |
| 8,385,610 B2* | 2/2013 | Corcoran | G06K 9/00228 382/103 |
| 9,041,734 B2* | 5/2015 | Look | G06T 15/20 345/428 |
| 9,094,576 B1* | 7/2015 | Karakotsios | H04N 7/157 |
| 2002/0180799 A1 | 12/2002 | Peck et al. | |
| 2003/0142068 A1 | 7/2003 | DeLuca | |
| 2004/0140956 A1 | 7/2004 | Kushler et al. | |
| 2005/0133693 A1 | 6/2005 | Fouquet et al. | |
| 2005/0248529 A1 | 11/2005 | Endoh | |
| 2006/0020898 A1 | 1/2006 | Kim et al. | |
| 2006/0038881 A1 | 2/2006 | Starkweather et al. | |
| 2007/0064112 A1* | 3/2007 | Chatting | G06F 3/0488 348/207.99 |
| 2007/0071277 A1 | 3/2007 | QUERY | |
| 2007/0164989 A1 | 7/2007 | Rochford et al. | |
| 2008/0005418 A1 | 1/2008 | Julian | |
| 2008/0013826 A1 | 1/2008 | Hillis et al. | |
| 2008/0019589 A1 | 1/2008 | Yoon | |
| 2008/0040692 A1 | 2/2008 | Sunday et al. | |
| 2008/0069438 A1 | 3/2008 | Winn et al. | |
| 2008/0122803 A1 | 5/2008 | Izadi et al. | |
| 2008/0123734 A1* | 5/2008 | Lin | H04N 1/00137 375/240.01 |
| 2008/0136916 A1 | 6/2008 | Wolff | |
| 2008/0137940 A1 | 6/2008 | Kakinami | |
| 2008/0140481 A1 | 6/2008 | Gold | |
| 2008/0158096 A1 | 7/2008 | Breed | |
| 2008/0174570 A1 | 7/2008 | Jobs et al. | |
| 2008/0266289 A1 | 10/2008 | Park | |
| 2008/0266530 A1 | 10/2008 | Takahashi et al. | |
| 2008/0276196 A1 | 11/2008 | Tang | |
| 2008/0291488 A1* | 11/2008 | Lin | H04N 1/00127 358/1.15 |
| 2008/0298571 A1* | 12/2008 | Kurtz | H04N 7/142 379/156 |
| 2009/0031240 A1 | 1/2009 | Hildreth | |
| 2009/0058845 A1 | 3/2009 | Fukuda et al. | |
| 2009/0079813 A1 | 3/2009 | Hildreth | |
| 2009/0196460 A1 | 8/2009 | Jakobs et al. | |
| 2009/0265627 A1 | 10/2009 | Kim et al. | |
| 2009/0296989 A1 | 12/2009 | Ramesh et al. | |
| 2009/0303342 A1* | 12/2009 | Corcoran | G06K 9/00228 348/222.1 |
| 2009/0313584 A1 | 12/2009 | Kerr | |
| 2010/0066676 A1 | 3/2010 | Kramer et al. | |
| 2010/0097332 A1 | 4/2010 | Arthur et al. | |
| 2010/0103244 A1* | 4/2010 | Brandsma | H04N 7/144 348/14.08 |
| 2010/0124941 A1* | 5/2010 | Cho | H04M 1/72544 455/556.1 |
| 2010/0125816 A1 | 5/2010 | Bezos | |
| 2010/0225743 A1 | 9/2010 | Florencio et al. | |
| 2011/0006978 A1 | 1/2011 | Yuan | |
| 2011/0029918 A1* | 2/2011 | Yoo et al. | 715/800 |
| 2011/0063403 A1* | 3/2011 | Zhang | G06K 9/00261 348/14.1 |
| 2011/0128223 A1 | 6/2011 | Lashina et al. | |
| 2011/0145718 A1 | 6/2011 | Ketola et al. | |
| 2011/0221667 A1 | 9/2011 | Lee | |
| 2011/0243388 A1 | 10/2011 | Sakaguchi et al. | |
| 2011/0316853 A1* | 12/2011 | Bar-Zeev | G06T 15/20 345/420 |
| 2012/0075492 A1* | 3/2012 | Nanu | H04N 5/23219 348/222.1 |
| 2012/0114172 A1* | 5/2012 | Du | G06K 9/00993 382/103 |
| 2012/0200498 A1 | 8/2012 | Quennesson | |
| 2012/0206333 A1 | 8/2012 | Kim | |
| 2012/0327196 A1* | 12/2012 | Ohba | G06K 9/00281 348/49 |
| 2013/0016102 A1 | 1/2013 | Look | |
| 2013/0033612 A1 | 2/2013 | Wu | |
| 2013/0038609 A1* | 2/2013 | Tsai | G01C 21/20 345/419 |
| 2013/0058537 A1 | 3/2013 | Chertok | |
| 2014/0118346 A1* | 5/2014 | Tsai | G06T 17/00 345/420 |
| 2014/0232745 A1* | 8/2014 | Cho | H04M 1/72544 345/632 |
| 2014/0300532 A1* | 10/2014 | Karkkainen | G06F 3/015 345/156 |

FOREIGN PATENT DOCUMENTS

| | | |
|---|---|---|
| JP | 2002-351603 | 12/2002 |
| JP | 2004-318826 | 11/2004 |
| JP | 2007-121489 | 5/2007 |
| JP | 2008-97220 | 4/2008 |
| WO | 02/015560 A3 | 2/2002 |
| WO | 06/036069 A1 | 4/2006 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Faceshift Documentation: Faceshift Studio Beta", http://www.faceshift.com/help/studio/beta/, 2012, 12 pages.

"Final Office Action dated Oct. 23, 2013", U.S. Appl. No. 12/786,297, 15 pages.

"Final Office Action dated Oct. 27, 2011", U.S. Appl. No. 12/332,049, 66 pages.

"Final Office Action dated Jun. 3, 2013", U.S. Appl. No. 13/083,303, 17 pages.

"Final Office Action dated Jun. 6, 2013", U.S. Appl. No. 12/332,049, 70 pages.

"Final Office Action dated Jul. 19, 2013", U.S. Appl. No. 13/209,243, 29 pages.

"First Office Action dated Mar. 22, 2013", China Application 200980146841.0, 39 pages.

(56) References Cited

OTHER PUBLICATIONS

"International Preliminary Examination Report on Patentability dated Oct. 17, 2013", International Application PCT/US2012/032148, 5 pages.
"International Search Report dated Oct. 2, 2012", International Application PCT/US2012/046518, Oct. 2, 2012, 7 pages.
"International Search Report dated Apr. 7, 2010", International Application PCT/US2009/065364, 2 pages.
"International Search Report dated Jul. 26, 2012", International Application PCT/US2012/032148, 7 pages.
"International Written Opinion dated Apr. 7, 2010", International Application PCT/US2009/065364, 7 pages.
"Introducing the Wii MotionPlus, Nintendo's Upcoming Accessory for The Revolutionary Wii Remote at Nintendo:: What's New", Nintendo Games, http://www.nintendo.com/whatsnew/detail/eMMuRj_N6vntHPDycCJAKWhE09zBvyPH, Jul. 14, 2008, 2 pages.
"Non Final Office Action dated Jan. 16, 2013", U.S. Appl. No. 13/209,243, 27 pages.
"Non Final Office Action dated Nov. 7, 2012", U.S. Appl. No. 12/332,049, 64 pages.
"Non Final Office Action dated Nov. 7, 2013", U.S. Appl. No. 13/246,561, 18 pages.
"Non Final Office Action dated Dec. 21, 2012", Korea Application 10-2011-7013875, 4 pages.
"Non Final Office Action dated Dec. 6, 2012", U.S. Appl. No. 13/083,303, 16 pages.
"Non Final Office Action dated Mar. 28, 2013", U.S. Appl. No. 12/786,297, 15 pages.
"Non Final Office Action dated Apr. 2, 2013", Japan Application 2011-537661, 2 pages.
"Non Final Office Action dated Jun. 10, 2011", U.S. Appl. No. 12/332,049, 48 pages.
"Notice of Allowance dated Oct. 2, 2013", U.S. Appl. No. 13/076,322, 11 pages.
"Notice of Allowance dated Aug. 14, 2013", U.S. Appl. No. 13/083,303, 6 pages.
"Office Action dated May 13, 2013", Canada Application 2,743,914, 2 pages.
Brashear, Helene et al., "Using Multiple Sensors for Mobile Sign Language Recognition", International Symposium on Wearable Computers, 2003, 8 pages.
Cappelletta, Luca et al., "Phoneme-To-Viseme Mapping for Visual Speech Recognition", Department of Electronic and Electrical Engineering, Trinity College Dublin, Ireland, 2012, 8 pages.
Cornell, Jay , "Does This Headline Know You're Reading It?", h+ Magazine, located at <http://hplusmagazine.com/articles/ai/does-headline-know-you%E2%80%90re-reading-it>, last accessed on Jun. 7, 2010, Mar. 19, 2010, 4 pages.
Haro, Antonio et al., "Mobile Camera-Based Adaptive Viewing", MUM '05 Proceedings of the 4th International Conference on Mobile and Ubiquitous Mulitmedia., 2005, 6 pages.
Hartley, Richard et al., "Multiple View Geometry in Computer Vision", vol. 2, Cambridge, 2000.
Hjelmas, Erik , "Face Detection: A Survey", Computer Vision and Image Understanding 83, No. 3, 2001, pp. 236-274.
Horn, Berthold K. et al., "Determining Optical Flow", Artificial Intelligence 17, No. 1, 1981, pp. 185-203.
Kamenicky, Jan et al., "Superfast Superresolution", "Superfast Superresolution," 18th IEEE International Conference on Image Processing, 2011, Šroubek Filip, Kamenický Jan, Peyman Milanfar, 2011, 4 pages.
Lucas, Bruce D. et al., "An Iterative Image Registration Technique with an Application to Stereo Vision", Proceedings of the 7th International Conference on Artificial Intelligence (IJCAI) Aug. 24-28, 1981, Vancouver, British Columbia, 1981, pp. 674-679.
Padilla, Raymond , "Eye Toy (PS2)", <http://www.archive.gamespy.com/hardware/august03/eyetoyps2/index.shtml, Aug. 16, 2003, 2 pages.
Park, Sung C. et al., "Super-Resolution Image Reconstruction: A Technical Overview", "Super-Resolution Image Reconstruction: A Technical Overview," IEEE Signal Processing Magazine, May 2003, Park, Sung Cheol; Park, Min Kyu, 2003, 16 pages.
Schneider, Jason , "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.
Tsai, Roger Y. , "A Versatile Camera Calibration Technique for High-Accuracy 3D Machine Vision Metrology Using Off-the-Shelf TV Cameras and Lenses", "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, Tsai, Roger Y., 1987, 22 pages.
Tyser, Peter , "Control an iPod with Gestures", http://www.videsignline.com/howto/170702555, Sep. 11, 2005, 4 pages.
Van Den Berg, Thomas T. , "Near Infrared Light Absorption in the Human Eye Media", Vision Res., vol. 37, No. 2, 1997, pp. 249-253.
Yang, Ming-Hsuan et al., "Detecting Faces in Images: A Survey", IEEE Transactions on Pattern Analysis and Machine Intelligence, vol. 24, No. 1, 2002, pp. 34-58.
Yang, Qingxiong et al., "Real-time Specular Highlight Removal Using Bilateral Filtering", http://vision.ai.uiuc.edu/~qyang6/, 2010, 14 pages.
Zhengyou, Zhang , "A Flexible New Technique for Camera Calibration", "A Flexible New Technique for Camera Calibration," IEEE Transactions on Pattern Analysis and Machine Intelligence, Zhengyou Zhang, 22(11): 1330-1334, 2000, 2000, 22 pages.
Zyga, Lisa , "Hacking the Wii Remote for Physics Class", PHYSorg.com, http://www.physorg.com/news104502773.html, Jul. 24, 2007, 2 pages.
International Search Report, dated Nov. 24, 2013, Applicant: Amazon Technologies, Inc., 17 pages.

\* cited by examiner

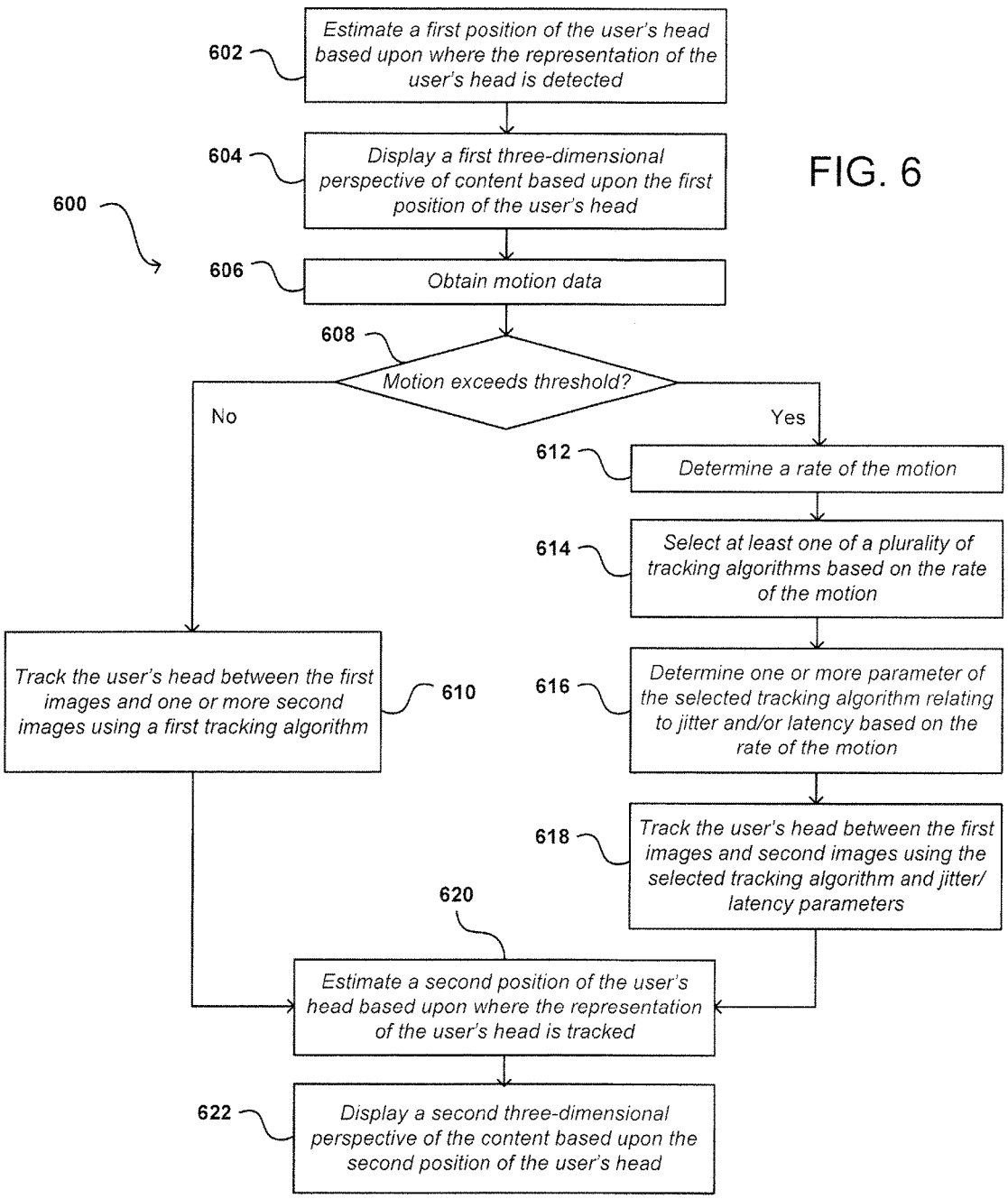

DYNAMIC OBJECT TRACKING FOR USER INTERFACES

BACKGROUND

As computing devices, such as laptops, tablets, or smartphones, become increasingly sophisticated, new and interesting approaches have arisen for enabling such devices to convey information to a user and vice versa. For instance, a graphical user interface (GUI) incorporating windows, icons, and menus may be an improvement over a command-line interface by simplifying how a user operates an underlying software application. A user can cause the underlying application to perform a desired function without having to memorize a command or its syntax and manually typing in the command. As another example, a touch-based interface can be an upgrade over an interface that relies on a directional keypad (e.g., up, down, left, right) by giving users a more immediate and precise way of selecting a UI element. Further, a touch-based interface may provide a more intuitive manner of operating a computing device by enabling users to directly manipulate UI elements. As devices become more powerful and new approaches are developed for users to interact with computing devices, UIs can be further improved upon to provide a more compelling and user-friendly computing experience.

BRIEF DESCRIPTION OF THE DRAWINGS

Various embodiments in accordance with the present disclosure will be described with reference to the drawings, in which:

FIG. 6 illustrates an example process for tracking an object in accordance with an embodiment;

DETAILED DESCRIPTION

Figure 1A:
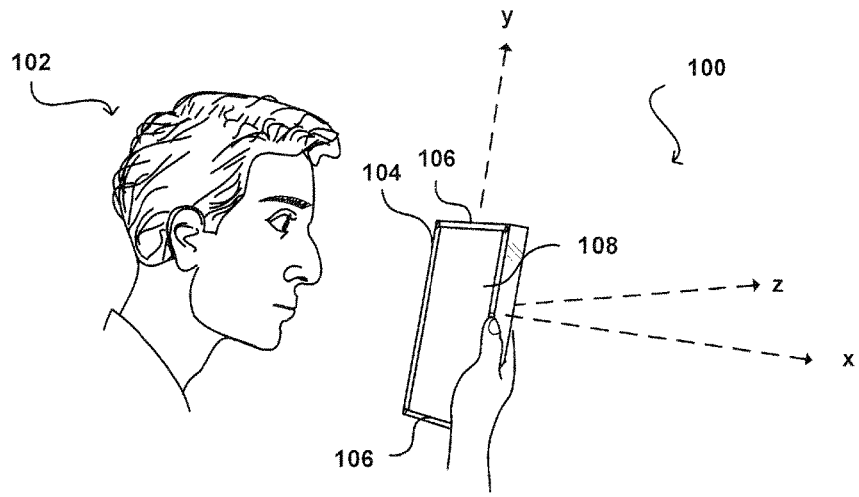
FIGS. 1A-1F illustrate an example approach for providing a user interface that is based on tracking of an object in accordance with an embodiment.

In various embodiments, user interfaces (UIs) based at least in part on a position and/or motion of an object are provided. In particular, one or more graphical elements of such a UI may be presented on a 2D display screen and one or more objects, such as a user's head or face (or facial features, such as a user's eyebrows, nose, mouth, etc.), can be tracked to determine how to animate or render the graphical elements to correspond to motion of the user's head or face and/or device to simulate three-dimensionality of the graphical elements. For example, a street mapping application of a computing device can display rooftops of various buildings when the user is viewing a display screen of the computing device from a first position, such as when the user's line of sight is perpendicular or substantially perpendicular to the display screen. As the user tilts the device, different faces of the buildings can begin to be displayed based at least in part on the change in the relative position of the user with respect to the device. For instance, when the device is tilted laterally to the right, the western faces of the buildings can be displayed (or displayed more prominently) and when the device is tilted laterally to the left, the eastern faces of the building can be displayed (or displayed more prominently). Further, the buildings may be presented with textural shading, shadowing, and/or reflections to further simulate three-dimensionality. When the user tilts the device, the appearance of the buildings can be altered such that their textural shading, shadowing, and/or reflections correspond to of the user's viewing angle with respect to the device. Such an approach may provide the user with an impression that the user is interacting within a three-dimensional environment and enhance the user's experience.

The quality of a user interface that has one or more aspects that depend at least in part upon object tracking can be influenced by the performance of the algorithm used for the tracking. Conventional tracking algorithms, however, can subject the display of various UI elements to spatial jitter, latency, and/or error. Spatial jitter can potentially be caused by noise from the sensors or other input components used for head or face tracking (e.g., cameras, inertial sensors) as well from hand tremor when a user holds a device, among other such sources. Latency, lag, or lack of responsiveness generally corresponds to the delay associated with acquiring updates in the position of the user's head or face. Error can be the result of a tracking process that is unable to determine the position of the user's head or face or inaccurately determining the position. Error can be due to variations in appearance, scale, rotation, position, and orientation of the user's head or face. Other factors such as camera metrics, illumination conditions, and occlusion can also affect the accuracy of a tracking process. To compound the difficulties of head and face tracking, these characteristics—jitter, latency, and error—can sometimes be inversely related to one other. For example, compensating for jitter can result in increased latency or introduce additional error and reducing latency can result in more jitter and a greater likelihood of error. Thus, careful deliberation must be made in selecting and implementing the tracking algorithm for user interfaces that are dependent on the output of these processes.

In addition to these considerations for choosing and integrating a suitable tracking process for user interfaces based on head or face position, motion of the user and/or device can also affect the user's experience with respect to the UI. The effects of UI jitter may have more of a negative impact on a user when the user and/or device are stationary. A corollary to this occurrence is that the effects of UI jitter may be less pronounced when the user and/or device are in motion. Although UI jitter may be less noticeable when the user and/or device are in motion, UI latency may be more conspicuous to the user when the user and/or device are moving. On the other hand, the effects of UI latency may be more acceptable to a user when the user and/or device are stationary.

Systems and methods in accordance with various embodiments of the present disclosure may overcome one or more of the aforementioned and other deficiencies experienced in providing user interfaces including one or more elements that have an appearance, when displayed, that depend at least in part upon object tracking. In various embodiments, motion of the device can be monitored and a particular tracking process can be determined based on a state of motion of the device. For example, as between some implementations of an elliptic tracker and some implementations of a template matching tracker, the elliptic tracker may be faster (i.e., associated with less latency) but also correspond to more jitter. Thus, in an embodiment, the template matching tracker can be selected for tracking the object (e.g., a user's head or face) when the device is determined to be stationary or substantially stationary while the elliptic tracker can be selected when the device is determined to be in motion. Further, various tracking algorithms may be associated with parameters that can be tuned so as to perform according to expected levels of jitter, latency, and error. For instance, decreasing the frequency of an image sampling rate of certain tracking algorithms can result in less latency (but more jitter and/or error). These parameters can be adjusted based on the state of motion of the device. In an embodiment, the parameters of a tracking process can be modified for low jitter (but higher latency) when the device is stationary and low latency (but more jitter and/or error) when the device is in motion.

Various other functions and advantages are described and suggested below in accordance with the various embodiments.

FIGS. 1A-1F illustrate an example approach for providing a user interface that is based on tracking of an object, such as a user's head or face, in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include a pair of cameras 106, one located towards the top of the device and the other towards the bottom of the device. Each of the cameras 106 are located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "bottom," "front," "side," and "back" are used for purposes of explanation and are not intended to require specific orientations unless otherwise stated. In some embodiments, a computing device may also include one or more additional cameras on the front of the device and/or one or more cameras on the back (and/or sides) of the device capable of capturing image data facing the back surface (and/or top, bottom, or side surfaces) of the computing device. In this example, each of the cameras 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

Figure 1B:
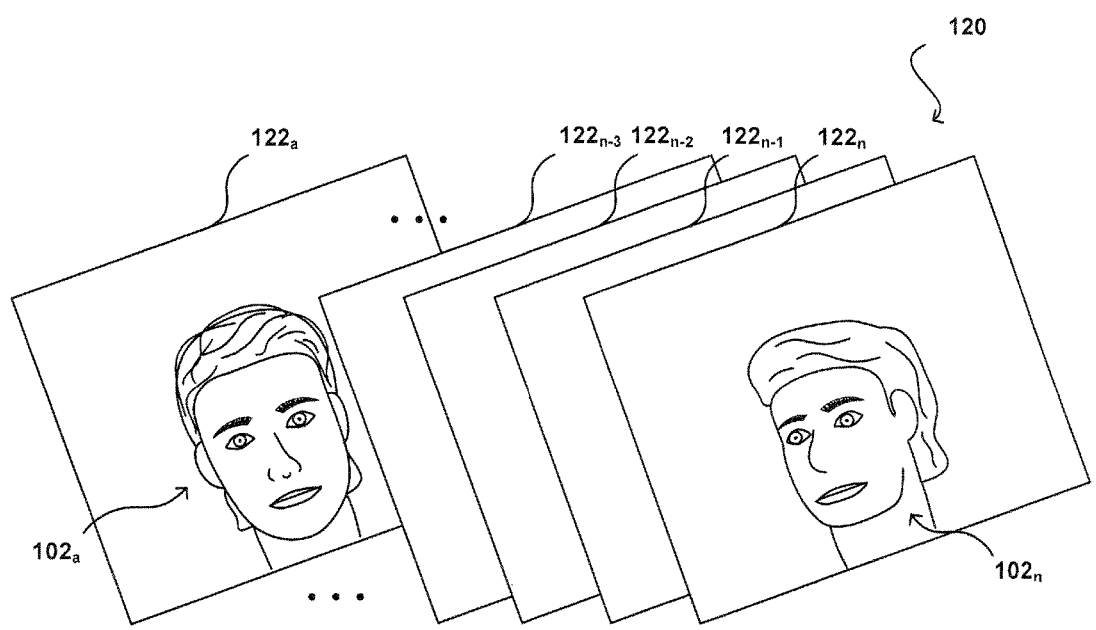

FIG. 1B illustrates a situation 120 in which a sequence of images 122a-122n has been captured by one of the front-facing cameras 106 as the user 102 operates the computing device 104. Although not shown in this example, in various embodiments, software (e.g., user application, software library, operating system) executing on a computing device attempts to determine the position, orientation, and/or movement of the head or face of the user (or facial features such as the user's eyebrows, eyes, nose, mouth, etc.) in three-dimensional space. Such a determination can be performed using various types of configurations. For example, two-dimensional image information can be captured to determine certain direction and motion information using a conventional camera and the computing device can utilize structured lighting to obtain three-dimensional information by projecting a regular pattern of light (e.g., infrared (IR) light) and analyzing the changes in the reflected pattern due to three dimensional objects. In other embodiments, other approaches such as those used for motion capture can be implemented for monitoring the change in location of specific features during user movement. For example, in some embodiments, two-dimensional image capture can be enhanced using a distance sensor, range finders, ultrasonic transceiver, or other such component capable of providing distance information. In other embodiments, three-dimensional or stereoscopic image information can be captured using multiple cameras to provide three-dimensional point data, or disparity information that can be used to determine motion in three dimensions. Various other approaches can be utilized as well as should be apparent to one of ordinary skill in the art in light of the teachings and suggestions contained herein.

In the example situation 120 of FIG. 1B, the sequence of images comprises an image 122a including the user's head 102a as the user is perpendicular or substantially perpendicular with respect the display screen of the computing device. As the user moves his head laterally towards the right or tilts the device laterally in a rightward direction (e.g., a rightward rotation along the y-axis), images 122b-122n-1 may be captured of intermediate positions of the user's head until the user's head is positioned towards the left of the front-facing camera's field of view as illustrated in image 122n.

Figure 1C:
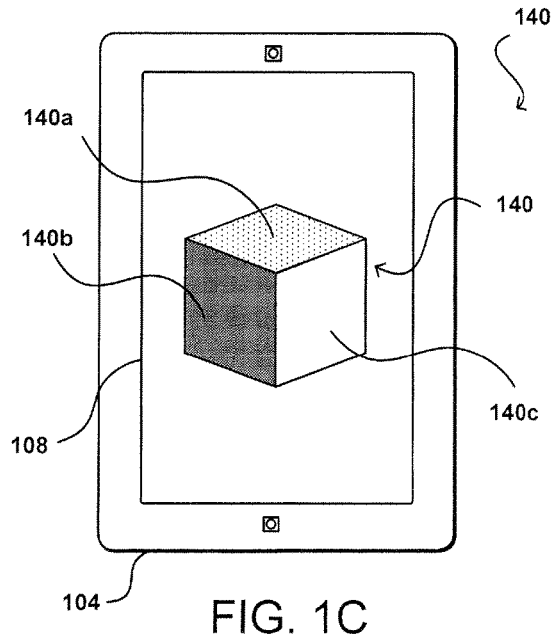
Figure 1D:
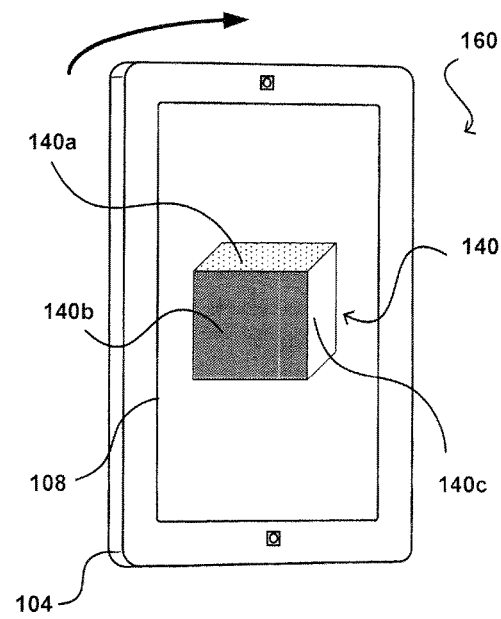

FIG. 1C illustrates an example of a first view or perspective 140 of a graphical element 140 corresponding to the image 122a (of FIG. 1B) presented on the display screen 108, and FIG. 1D illustrates an example 160 of a second view or perspective of the graphical element 140 corresponding to the image 122n (of FIG. 1B). That is, as the user moves his head or tilts the device laterally towards the right (e.g., rightward along the y-axis), the graphical element 140 may be redrawn or rendered according to the position of the user's head with respect to the device. In this example, the graphical element 140 comprises a 3D cube with a top surface 140a, a left front-facing surface 140b, and a right front-facing surface 140c. At an initial position of the user with respect to the computing device, such as depicted in image 122a (of FIG. 1B), the first view or perspective of the graphical element 140 may show left front-facing surface 140a and right front-facing surface 110b at equal proportions or substantially equal portions. As the device tracks the user and/or device rotating laterally from left to right until arriving at a second position, such as depicted in image 122n (of FIG. 1B), a second view or perspective 160 of the graphical element 140 may be drawn or rendered as illustrated in FIG. 1D. In FIG. 1D, top surface 110a, left surface 110b, and right surface 110c remain visible. However, each of the surfaces has been transformed according to a 3D projection that is based on the position of the user's head. Further, FIG. 1D shows left surface 110b being presented prominently while right surface 110c is presented at a more oblique angle.

Figure 1E:
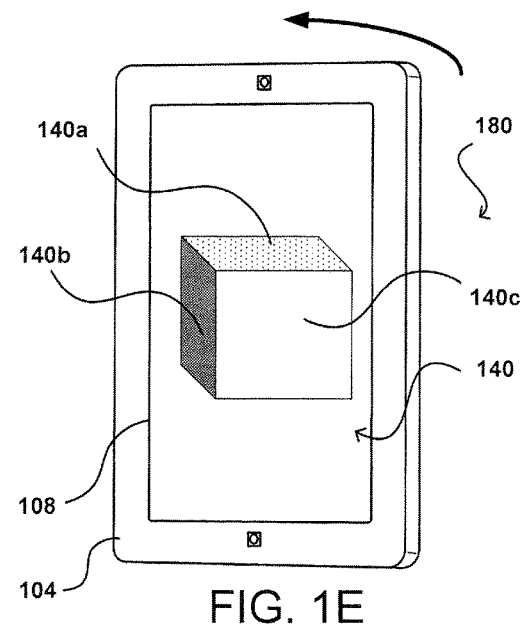
Figure 1F:
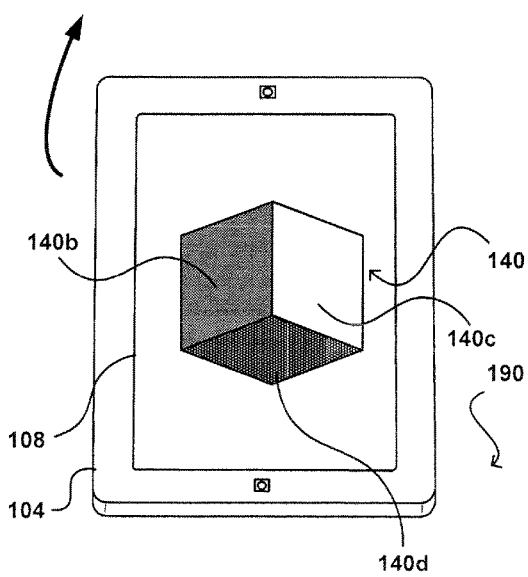

FIG. 1E illustrates a third view or perspective 180 of graphical element 140. In this example, the device may track the user and/or device from the initial position rotating from right to left until arriving at a third position to cause the right surface 110c to be displayed more prominently than left surface 110b. When the device tracks the user moving his head upward or tilting the device forward (e.g., forward rotation along the x-axis) from the initial position until arriving at a fourth position, a fourth view or perspective 190 of the 3D cube 140 can be presented as illustrated in FIG. 1F. In FIG. 1F, the forward rotation of the user and/or device may cause the bottom surface 140d to be revealed and the top surface to be hidden. It will be appreciated that the user's head or face (or facial features, such as the user's eyebrows, eyes, nose, etc.) can generally be tracked according to six degrees of freedom (e.g., motion along the x-, y-, and z-axes or forward/backward, up/down, and left/right, and rotation along the x-, y-, and z-axes or pitch, yaw, and roll) and the view of the graphical elements presented on a display screen can be adapted to the user's perspective.

A user interface such as that illustrated in FIGS. 1C-1F may provide the illusion that the user is interacting with the device in an immersive three-dimensional environment to enhance the user's experience. In other embodiments, the impression of three-dimensionality can be augmented by displaying shadowing according to a fixed virtual light source corresponding to the user's viewing angle. As the user moves his head and/or the device, the shadows of graphical elements can be redrawn or rendered relative to the fixed virtual light source. Alternatively, or in addition, graphical elements can include textural shades and/or reflections that change in accordance with the position of the user's head. Approaches for rendering a three-dimensional perspective of graphical elements for a two-dimensional display are discussed in co-pending U.S. patent application Ser. No. 13/209,243 entitled, "Simulating Three-Dimensional Features," filed Aug. 11, 2012, which is incorporated herein by reference.

Figure 2A:
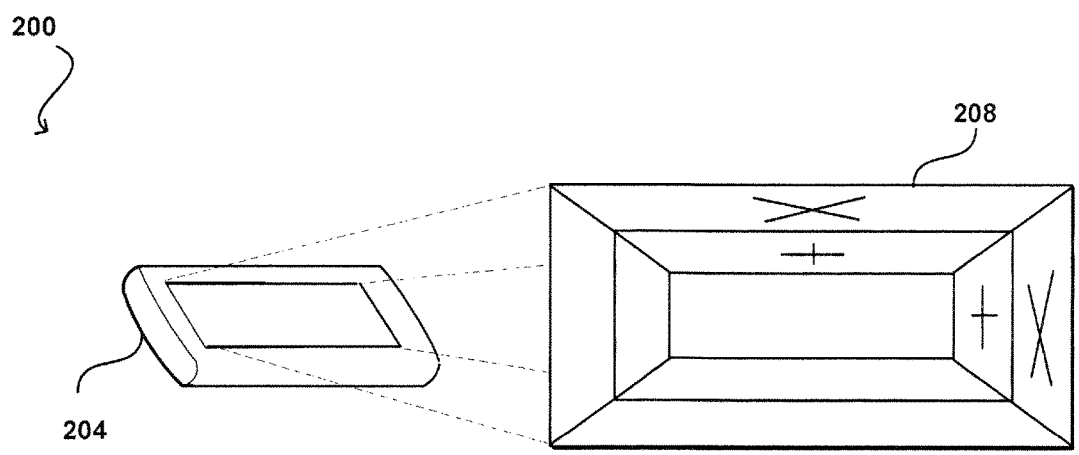
FIGS. 2A-2D illustrate an example approach for providing a user interface that is based on tracking of an object in accordance with an embodiment.
Figure 2B:
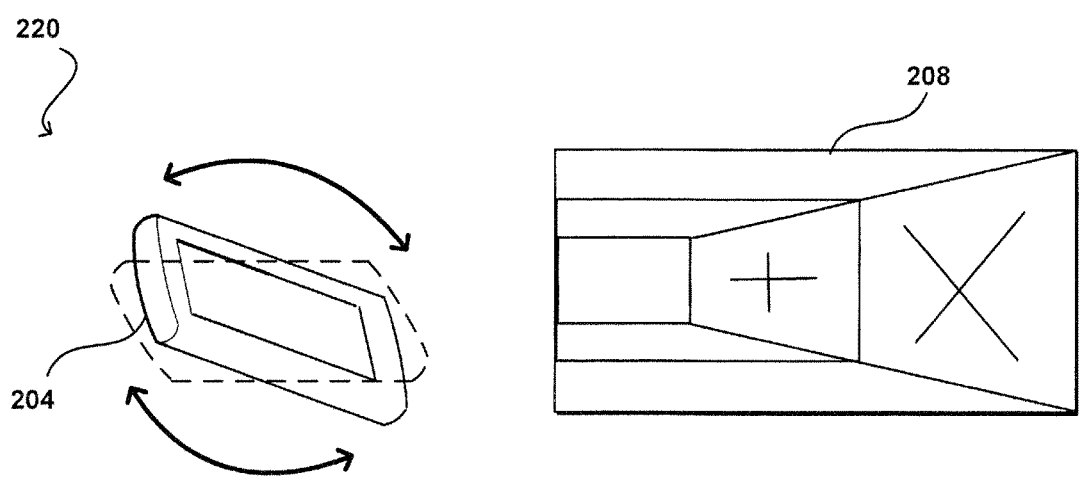
Figure 2C:
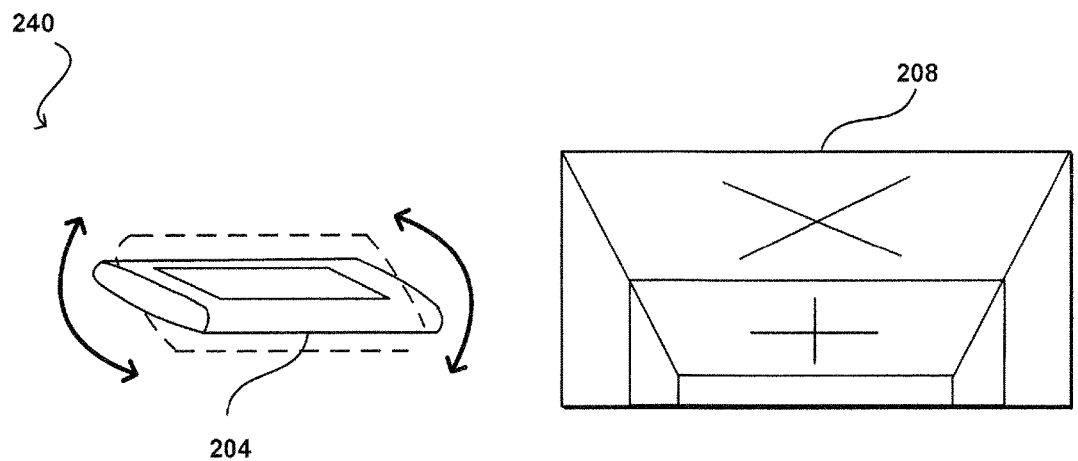
Figure 2D:
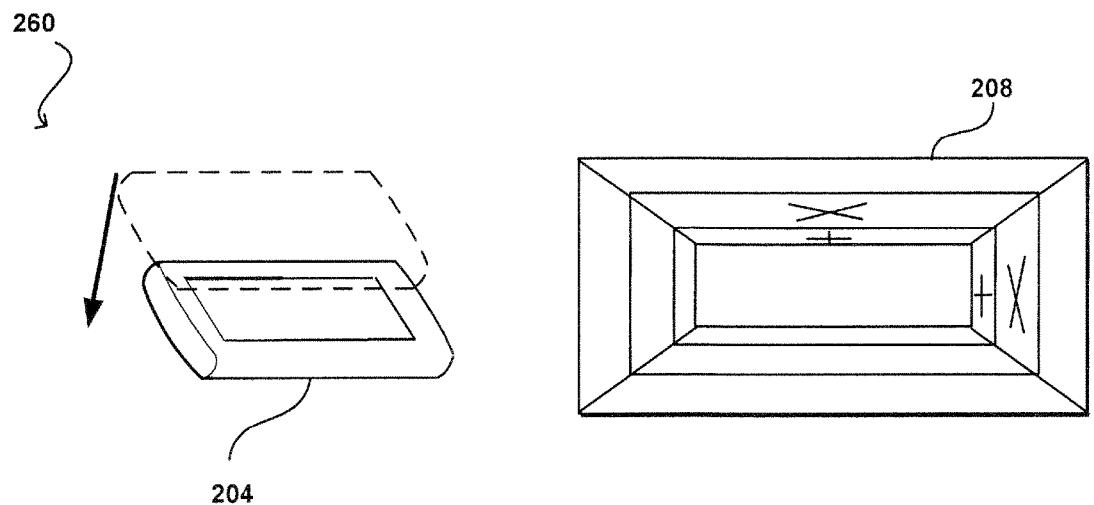

FIGS. 2A-2D illustrate another example approach for providing a 2.5D or 3D user interface that is based on tracking of a head or face of a user in accordance with an embodiment. In this example, a three-dimensional environment is represented using the two-dimensional display element 208 of a computing device 202. As illustrated in FIG. 2A, when the user holds the device steady at a first position, a relatively straightforward view of the three-dimensional environment is rendered on the display. A user viewing the display in FIG. 2A might wish to get a better view of the elements displayed towards the right of the screen, or elements that are "off screen" to the right. As illustrated in FIG. 2B, the user can tilt his head, tilt the device from left to right, or perform a similar motion that will be detected by the device as input to rotate the field of view rendered for display. The image that is displayed can then show an improved view of elements or portions of the image that were previously to the right of the center of the image. Similarly, the user might want to view elements or portions above or below that which is currently displayed by the display element. As illustrated in FIG. 2C, the user can tilt the device forward to change the displayed image such that the image provides a point of view that better illustrates portions that were previously above a center point of the previous image. As illustrated in FIG. 2D, the user can also move the device upward or downward to zoom in and out of elements depicted in display element 208. Thus, a user can change a point of view used to display the image by generating input through user and/or device motion. Additionally, in some embodiments, once the image that is displayed is altered to display the elements or portions of the image that were previously displayed away from the center of the image, the device can be configured to receive an input to "normalize" or adjust the displayed image so that the displayed area of interest is reoriented to the center of the displayed image (e.g., the displayed X portion moves to the center of the display). This allows the relative orientation between the user and the device to return to a normal perpendicular viewing orientation. For example and referring to FIG. 2B, after altering the orientation of the user and/or device so that the X element is the area of interest, the device can receive an input from the user that updates the display so that, rather than the + element, the X element is centered on the displayed image and the user can return to a normal perpendicular viewing position with respect to the device. The reorientation can be selected using a cursor or touch screen, button selection or gesture, among other possibilities.

The examples of FIGS. 1A-1F and 2A-2D illustrate graphical elements presented according to an initial position of the user that are redrawn and rendered according to a second position of the user. It will be appreciated that in various embodiments, there may also be interim positions between the initial position and the second position that also cause the graphical elements to be redrawn and rendered based on the interim positions of the user's head to provide an animation effect. In certain situations, however, the user and/or device may not move smoothly such that the user interface may appear jittery to the user. For example, the sequence of intermediate images 122b-122n-1 of FIG. 1B may not necessarily correspond to a smooth transition from the user facing the display screen directly, as in image 122a, to a rightward tilt of the user's head and/or device, as in image 122n. The user may be moving his head at different rates of speed, the device may shift from right to left due to hand tremor, poor lighting conditions or shadows may obscure the user's face or head, portions of the user's head or face may become occluded such as by the user scratching his nose, among other possibilities. If the UI is configured to correspond to the user's position as represented in each intermediate image, the UI can be subject to an amount of jitter that may be unacceptable to users, particularly when the device is stationary or substantially stationary. In various embodiments, motion of the device can be analyzed and a tracking process and/or a set of parameters for the tracking process can be determined that is suitable for the state of motion of the device. In some embodiments, motion of a computing device can be obtained using inertial sensors, such as accelerometers, gyroscopes, magnetometers, and/or a combination thereof. In other embodiments, motion can be determined using time of flight techniques based on input/output components such as light-based transceivers (e.g., infrared, laser, structured lighting), ultrasonic transceivers, microwave transceivers, among others. In still other embodiments, motion of the device can be calculated from a distance between determined locations over time using elements capable of providing geopositioning and/or location data, such as a global positioning system (GPS), cellular network component, a Bluetooth® component, a Wi-Fi component, a radio frequency (RF) component, a near field communications (NFC) component, among others. In yet other embodiments, components such as pedometers, speedometers, odometers, and the like, can also be used for determining motion of the device.

After the motion of the device is determined, such as whether the device is stationary or substantially stationary, in steady motion (e.g., moving at uniform velocity), or in acceleration, a suitable tracking algorithm can be selected for tracking the user's head or face. As mentioned, as between certain implementations of a template matching tracker and certain implementations of an elliptic tracker, the template matching tracker may be more robust to jitter but can also be more susceptible to latency relative to the elliptic tracker. In an embodiment, the template matching tracker can be selected for tracking the user's face or head when the device is determined to be stationary or substantially stationary while the elliptic tracker can be selected when the device is determined to be in motion. Other tracking algorithms, as discussed elsewhere herein, can also be analyzed and compared with respect to one another to determine relative amounts of jitter, latency, and/or error. A tracking process associated with the least amount of UI jitter can be selected for tracking the user's head or face when the device is stationary or substantially stationary, a tracking process associated with the least amount of latency can be selected for tracking when the device is accelerating, and a tracking process associated with an intermediate level of and/or an intermediate degree of latency can be selected for tracking when the device is determined to be moving at uniform velocity. Alternatively, or in addition, parameters of a tracking process can be dynamically adjusted based on the state of the motion of the device. These parameters may relate to jitter, latency, and/or error as experienced in a user interface of a computing device. For example, some tracking algorithms may be associated with an image sampling rate such that when the frequency of image sampling is reduced, latency may also be reduced (but jitter and/or error may be increased). Various other approaches for dynamic head tracking for user interfaces can be implemented as appreciated by those of ordinary skill in the art in view of the teachings and disclosure herein.

For any pair of cameras that have at least a partially overlapping field of view, three-dimensional imaging can be performed by capturing image information for one or more objects from two different perspectives or points of view, and combining the information to produce a 3D image. Example approaches include calculating an amount of disparity through a process such as edge matching, feature location and matching, color matching, and/or texture matching, and combining the disparity information with color information from each perspective to generate a three-dimensional image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated. It should be understood, however, that 3D image data can be used for other purposes or for further processing, such that using the image data to generate and display a 3D image is not required. For example, the data can be used to determine shape and/or relative position information for various computer vision techniques, such as for determining one or more viewpoint and scale invariant feature descriptors used for object recognition and/or tracking.

As mentioned, various embodiments include tracking of one or more objects of interest in three-dimensional space. By recovering the third dimension, i.e., depth, distance, or disparity, from at least a pair of 2D images, head or face tracking can be less sensitive to factors such as shadows, lighting changes, and camera dynamics. Depth, disparity, or distance information can also optimize head and face tracking. As the relative sizes of a user's facial features are known, the computational expense of searching over scales can be minimized and the probability of false detections may be reduced since the search space is decreased. Depth, distance, or disparity also can be used to obtain shape and size information that can help to differentiate among foreground objects for improved tracking. Further, occlusions can be more easily detected and handled more explicitly. Depth, distance, or disparity can also provide at least a third, disambiguating dimension that can help to improve prediction in tracking.

Figure 3A:
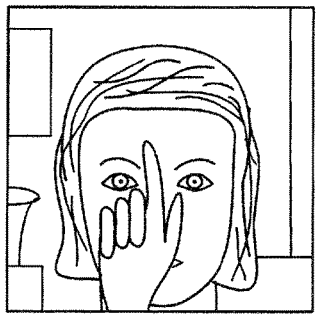
FIGS. 3A-3D illustrate an example approach for determining a stereo disparity image or map in accordance with an embodiment.
Figure 3B:

FIGS. 3A-3D illustrate an example approach for determining depth, distance, or disparity information from at least two images captured at the same time or substantially the same time in accordance with an embodiment. FIG. 3A illustrates what will be referred to herein as a "left" image 300 and FIG. 3B illustrates what will be referred to herein as a "right" image 320, although other orientations can be used as well in other situations and embodiments. These images are each captured by one of a pair of cameras that are offset from each other along a horizontal axis, such that one camera is offset to the left and one is offset to the right in this orientation. As discussed elsewhere herein, pairs of cameras can be offset in up and down directions, among other such options. Since each image is captured using a camera at a slightly different location, the position of objects in each image will be different. In order for the images to combine to form an accurate three-dimensional image, the cameras used to capture the component images should be sufficiently aligned and/or rectified to represent the correct amount of disparity. When the cameras are aligned, correlating or matching feature points between images captured with a stereoscopic camera pair can be determined based at least in part on an epipolar line between the respective images and determined coordinates for at least one of the feature points.

Figure 3C:
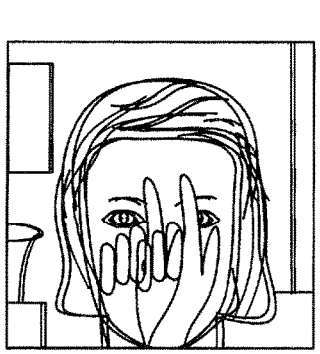
Figure 3D:
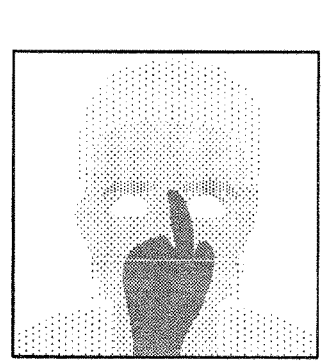

In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the detection or tracking processes discussed elsewhere herein. FIG. 3C illustrates an example combination image 340, and FIG. 3D illustrates a stereo disparity image 360 of the combination image 340 showing the relative position of various objects in the captured images 300 and 320. As illustrated, objects closest to the camera (as indicated by darker shading), such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras.

Various approaches can be used to determine a stereo disparity image, such as the example disparity image 360 of FIG. 3D, or a stereo disparity map that associates each pixel (x,y) with a disparity value d, i.e., defining a function of (x, y, d). In general, determining stereo disparity can include one or more of the following: a matching cost computation, cost aggregation, disparity computation or optimization, and disparity refinement. Matching cost computations involve analyzing respective regions of a pair of stereo images to determine a similarity measure such as minimizing the sum of squared differences (SSD) or the sum of absolute differences (SAD), or maximizing the normalized cross correlation (NCC) or cross coefficient (CC). If (x,y) represents a pixel in I and (x',y') represents a pixel in T, then these functions can be defined as follows:

$$SSD(x, y) = \sum_{x',y'} [T(x', y') - I(x + x', y + y')]^2$$

$$SAD(x, y) = \sum_{x',y'} |T(x', y') - I(x + x', y + y')|$$

$$NCC(x, y) = \sum_{x',y'} T(x', y') \cdot I(x + x', y + y')$$

$$CC(x, y) = \frac{\sum_{x',y'} T'(x', y')^2 I(x + x', y + y')}{\sqrt{\sum_{x',y'} T'(x', y')^2 \sum_{x',y'} I(x', y + y')^2}},$$

where T'(x',y') is the average value of T, as defined by:

$$T'(x', y') = T(x', y') - \frac{1}{wh} \sum_{x',y'} T(x', y')$$

and I'(x+x',y+y') is the average value of I in the region coincident with T, as defined by:

$$I'(x + x', y + y') = I(x + x', y + y') - \frac{1}{wh} \sum_{x',y'} T(x', y'),$$

where x'=0 ... w−1 and y'=0 ... h−1 for SSD, SAD, NCC, and CC.

Matching cost computations can also be based on truncated quadratics, contaminated Gaussians, phase responses, filter-bank responses, among others. Another step for disparity computation is cost aggregation, which relates to distributing the matching cost computation over a support region, such as by summing or averaging over a respective window or region of a pair of stereo images. A support region can be either two-dimensional at a fixed disparity or three-dimensional in x-y-d space. Two-dimensional cost aggregation techniques can be based on square windows, Gaussian convolutions, multiple shiftable windows, windows with adaptive sizes, and windows based on connected components of constant disparity. Three-dimensional cost aggregation techniques can be based on disparity differences, limited disparity gradients, and Prazdny's coherence principle. In some embodiments, iterative diffusion can also be used for aggregating the matching cost to a pixel's neighbors. Iterative diffusion operates by adding to each pixel's cost the weighted values of its neighboring pixels' costs.

Disparity computation and optimization can be characterized as local or global. Local methods involve selecting the disparity associated with the minimum (or maximum) cost value at each pixel. As such, local methods are sometimes characterized as a "winner-take-all" approach. Global methods can be based on an energy-minimization function, wherein disparity at each pixel is based on minimizing a global energy. Global methods can also depend on smoothness assumptions made by a particular global algorithm. Once a global energy has been determined, a variety of algorithms can be used to find the disparity at each pixel, including techniques based on Markov random fields, simulated annealing, highest confidence first approaches, and mean-field annealing. Global optimization techniques can also be based on max-flow, graph-cuts, dynamic programming methods, cooperative algorithms, among other approaches.

Refinement techniques can also be used for improving computation of the stereo disparity image or mapping by determining disparity at the sub-pixel level. One such method is applying iterative gradient descent and fitting a curve to the matching cost computations at discrete disparity levels. Other refinement approaches can include cross-checking (e.g., comparing left-to-right and right-to-left disparity maps), median filtering to compensate for incorrect matching, distributing neighboring disparity estimates to fill in "holes" caused by occlusion, among other techniques.

As discussed, determining a stereo disparity image or mapping can involve one or more of matching cost computation, cost aggregation, disparity computation or optimization, and disparity refinement. For example, in an embodiment, calculating a stereo disparity image or mapping can include determining the matching cost according to a squared difference of intensity values at a particular disparity, aggregating by summing matching costs over square windows with constant disparity, and computing disparities by selecting the minimal aggregated value at each pixel. In another embodiment, the stereo disparity image or mapping can be determined by combining matching cost computation and cost aggregation (e.g., NCC or rank transform).

In other embodiments, the stereo disparity image or mapping can be determined by setting explicit smoothness assumptions and then solving an optimization problem. Such an approach may not require cost aggregation but instead searches for a disparity for each pixel that minimizes a global cost function that combines matching cost computations and smoothness terms. As mentioned, minimization can be based on simulated annealing, mean-field diffusion, graph cuts, among others. In still other embodiments, determining the stereo disparity image or mapping can be based on iterative algorithms (e.g., hierarchical algorithms). Various other combinations can be implemented for computing a stereo disparity image or mapping to those of ordinary skill in light of the teachings and disclosure herein.

Figure 4:
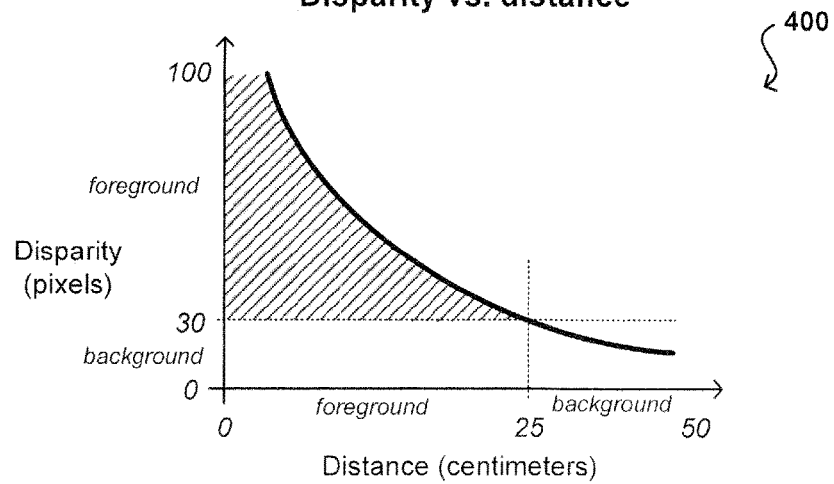
FIG. 4 illustrates an example plot showing a relationship between disparity and distance for an example stereoscopic imaging process that can be used in accordance with various embodiments.

FIG. 4 illustrates an example plot 400 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 400 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{f \times B}{d}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device.

In some embodiments, a head or face detection process is used to detect the user's head or face and determine where a representation of the user's head or face is positioned in one or more images. Approaches for detecting a user's head or face or facial features (e.g., eyebrows, eyes, nose) can be based on feature detection, background subtraction, segmentation, supervised learning, among others. Feature-based detection approaches generally involve extracting features from an image and applying various rules, metrics, or heuristics to determine whether a user's head, face, and/or facial features are present in the image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). In other embodiments, geometric rules can be applied to analyze the spatial relationships among features to verify whether a user is located in an image. Skin color can also be used as a basis for detecting and/or tracking a user because skin color comprises a limited range of the color spectrum that can be relatively efficient to locate in an image.

Extracted features can also be based on higher-level characteristics or features of a user. One example of higher-level feature detection may involve detection of a user feature (e.g., head or face) and then validating existence of the user in an image by detecting more granular components (e.g., eyes, nose, mouth). In this example, a representation of the user can be detected within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented in image. An example set of rules for detecting the user's head or face may dictate that the upper round part of a face comprises a set of pixels of uniform intensity, the center part of a face comprises a set of pixels of a second uniform intensity, and the difference between the intensities of the upper round part and the center part of the face are within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics.

In some embodiments, background subtraction techniques can be used to detect the head or face of a user. Background subtraction involves developing a model of the background in a first image and then determining outlier pixels from the background model in a second image. Significant deviations from the background model may correspond to a representation of the user in the second image. Some background subtraction techniques include modeling background pixels as discrete states (e.g., background, foreground, shadow) and using hidden Markov models (HMM) to identify small blocks of an image that correspond to each state, modeling the background using eigenspace decomposition with the background corresponding to the most descriptive eigenvectors and the foreground corresponding to the difference between the projection of the current image to the eigenspace, or modeling the background using autoregressive moving average (ARMA) processes to filter repetitive motion (e.g., grass blowing in the wind or swaying trees), among other approaches.

In some embodiments, techniques based on segmentation can be used to detect the head or face of the user in an image. Segmentation-based approaches partition an image into similar regions, and include mean-shift clustering, graph cuts, active contours, among others. The mean-shift approach finds clusters in the spatial and color space [l, u, v, x, y] where l is the brightness, u and v are the chrominance, and x and y are the location. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position. In graph cut methods, image segmentation is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. In one embodiment, a minimum cut criterion can be used to find partitions that minimize a cut. In another embodiment, a normalized cut can be used that depends on edge weights as well as the ratio of the total connection weights of nodes in each partition to all nodes of the graph.

In active contours approaches, a candidate head or face can be segmented by transforming a closed contour of the head or face boundary such that the contour tightly encloses the head or face region according to an energy function that can be computed locally or globally. Local information is often determined from an image gradient evaluated around the contour while global features are computed inside and outside the object. Global features can include color and texture.

In some embodiments, techniques based on supervised learning can be used to detect the head or face of a user. Supervised learning approaches involve learning different views or perspective of the head or face of the user from a set of examples. Supervised learning methods include principal component analysis (PCA), neural networks, support vector machines (SVM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities (i.e., $$\frac{P(\text{image} \mid \text{object})}{P(\text{image} \mid \text{non-object})} > \frac{P(\text{non-object})}{P(\text{object})}.$$

Inductive learning approaches, such as those based on the C4.5 algorithm or the Find-S algorithm, can also be used to detect the representation of users in an image.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a face candidate if the difference of the sum of pixels within two regions meets a threshold for a Haar-like feature determined during the training stage. Viola-Jones further utilizes the concept of attentional cascading which observes that within an image, most sub-windows are non-face instances. Thus, smaller and more efficient classifiers can be used to reject sub-windows unlikely to be faces at earlier stages while keeping almost all of the positive instances. More complex classifiers are used at later stages to examine face candidates that have not been rejected as face candidates.

Surveys of various approaches of head and face detection are discussed in Yang, Ming-Hsuan et al., "Detecting faces in images: A survey." *Pattern Analysis and Machine Intelligence, IEEE Transactions* on 24, no. 1 (2002): 34-58 and Hjelmäs, Erik et al. "Face detection: A Survey." *Computer Vision and Image Understanding* 83, no. 3 (2001): 236-274, which are each incorporated herein by reference.

Figure 5A:
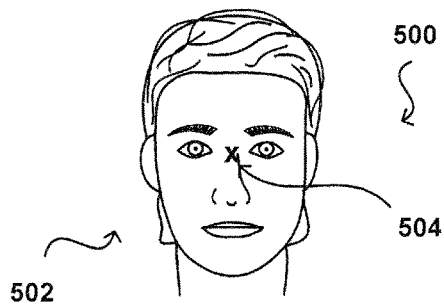
FIGS. 5A-5E illustrate example approaches of tracking an object that can be used in accordance with various embodiments.
Figure 5B:
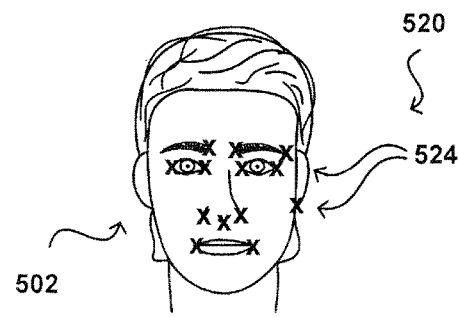

Systems and approaches in accordance with various embodiments track the head or face of a user between a first set of images captured at a first time (simultaneously or substantially at the same time) and a second set of images captured at a second time (simultaneously or substantially at the same time). Various approaches can be used to track the head or face of a user. FIGS. 5A and 5B illustrate example approaches of point tracking that can be used to track the head or face of a user in accordance with various embodiments. In FIG. 5A, a representation of the user 502 is shown with the user's head being represented as a single point 504 between the user's eyes. In some embodiments, the user 502 may be defined or represented as a three-dimensional vector from the point 504 between the user's eyes to a point corresponding to a computing device, such as the point at the center of the front face of the computing device.

FIG. 5B illustrates an example representation of the user 502 wherein salient features of the user are identified and assigned points 524. Feature points can be determined using the Moravec detector, Harris corner detector, the Kanade Shi Tomasi (KLT) detector, the Scale-Invariant Feature Transform (SIFT) detector, or variations thereof. Other feature point detection techniques that can be used include Förstner corner detection, Wang and Brady corner detection, smallest univalue segment assimilating nucleus (SUSAN) corner detection, Trajkovic and Hedley corner detection, features from accelerated segment test (FAST) detection, among others.

Point tracking methods can be deterministic or probabilistic. Deterministic approaches attempt to minimize a cost of associating the user's head or face in a first image to a candidate head or face in a second image. Probabilistic point tracking methods model the uncertainties of sensor data to establish correspondence from image to image. For example, measurements obtained from sensors often include noise and tracking the user's head or face may be susceptible to random motions that aren't necessarily desirable to capture, such as hand tremor or the device being operated in a moving vehicle. Probabilistic point tracking methods typically use the state space approach to model properties such as position, velocity, and acceleration and take into account measurement uncertainties in the modeling. Probabilistic approaches include Kalman filtering, extended Kalman filtering, particle filtering, among others.

Figure 5C:
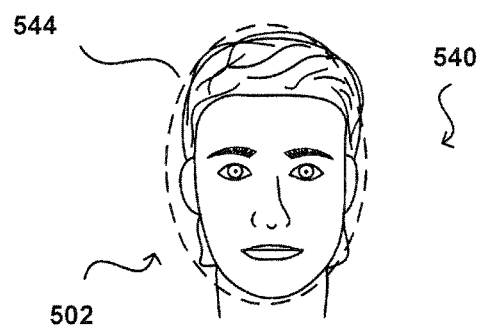

In at least some embodiments, one or more kernel tracking processes can be used to track the head or face of the user. As used herein, "kernel" refers to a primitive shape and/or appearance of the head or face of the user. FIG. 5C illustrates an example kernel-based approach for tracking the head or face of the user 502, wherein the head or face of the user is encompassed by an ellipse 544. A kernel representing the user 502 can include the ellipse 524 and an associated histogram. In other embodiments using a similar approach, other primitive geometric shapes can be used, such as squares, rectangles, circles, among others.

Kernel-based tracking methods determine the motion of the face or head of the user from image to image, and include simple template matching, optical flow analysis, and multiview appearance modeling. In simple template matching, a brute force approach can be used to search an image for a region similar to a template of the user's head or face defined in a previous image. The position of the template in the current image is determined by a similarity measure, such as a maximum of the cross-correlation or normalized cross-correlation or a minimum of a criterion, such as the mean squared error, mean absolute difference, or the number of threshold differences. Templates can define image intensity, color features, surface radiance, or image gradients of the face or head of the user. A template can also include color histograms or mixture models of the pixels of a primitive geometric bounding the object. In some embodiments, other search methods can be used instead of a brute force search, such as mean-shift tracking (discussed elsewhere herein) or Jepson tracking. In Jepson tracking, the head or face of the user is represented as a three component mixture comprising stable appearance features, transient features, and noise. An online version of the expectation maximization (EM) algorithm is used to determine the parameters of the mixture.

Another kernel-based tracking approach is to compute the translation of a kernel representing the head or face of the user using an optical flow method. Optical flow techniques compute motion from spatial and temporal derivatives of image features such as intensities or filtered versions of the image. Such techniques are based on the assumption that all temporal intensity changes are due to motion only. In some embodiments, local approaches based on the Lucas-Kanade optical flow algorithm can be used to track the head or face of the user. The algorithm is set forth in Lucas, Bruce D. et al. "An iterative image registration technique with an application to stereo vision." *In Proceedings of the 7th international joint conference on Artificial intelligence.* 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to track the head or face of the user. The Horn-Schunk algorithm is set forth in Horn, Berthold K P et al. "Determining optical flow." *Artificial intelligence* 17, no. 1 (1981): 185-203, which is incorporated herein by reference.

In template-based matching and optical flow analysis, the kernels are usually generated online and represent the information gathered about the user's head or face from the most recent observations. However, the user's head or face may appear different according to the perspectives of the cameras used to capture the images being analyzed, and if the view of the user's head or face changes significantly during tracking, the kernel may no longer be valid and tracking will fail. Thus, in some embodiments, different perspectives of the user's head or face can be learned offline and used for tracking. Kernel-based tracking based on multiview appearance modeling include PCA and SVM, which are discussed elsewhere herein.

Figure 5D:
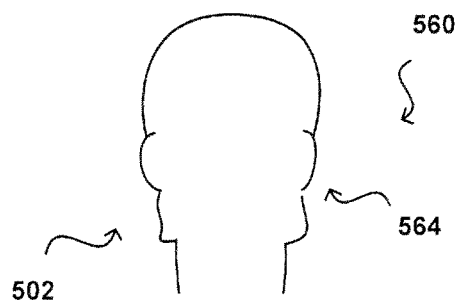
Figure 5E:
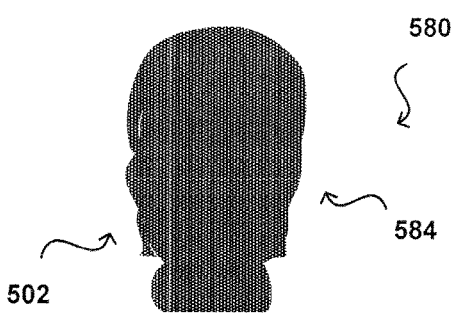

Objects can have complex shapes that sometimes cannot be accurately represented as primitive geometric shapes. In particular, the head or face of the user cannot be circumscribed precisely by simple geometric shapes. Thus, in at least some embodiments, one or more silhouette or contour tracking processes can be used to track the head or face of the user. FIGS. 5D and 5E illustrate example approaches of contour or silhouette-based tracking that can be used to track the face or head of the user in accordance with various embodiments. FIG. 5D illustrates an example 560 of the contours 564 of the head or face of the user 502, defined by the boundaries of the user's head or face. Other contour representations of the user may comprise of points at the boundaries of the user's head or face instead of edges. The region inside the contours is sometimes referred to as the "silhouette," which can also be used to represent the user's head or face for tracking in some embodiments. FIG. 5E illustrates an example of a silhouette 584 of the head or face of the user 502.

In contour-based tracking approaches, an initial contour of the user's head or face is evolved to its new position in a current image. Tracking the user's head or face by evolving a contour of the head or face can be performed using a state model of the contour shape and motion or minimizing the contour energy using direct minimization techniques. In the contour shape and motion modeling approach, the state of the model is updated at each time instant such that the contour's a posteriori probability is maximized. The posterior probability depends on the prior state and the current likelihood which is typically defined in terms of the distance of the contour from observed edges. Kalman filtering or particle filtering can be used to predict new states of the contour and update the states of the contour. In energy-based contour tracking, the energy of the contour can be minimized using greedy methods or by gradient descent. The contour energy can be defined in terms of temporal information in the form of optical flow fields or appearance statistics generated from the user's head or face and the background regions.

In silhouette-based tracking methods, the silhouette is searched for image to image. Such approaches are similar to approaches for template matching in that the search for a silhouette and its associated model in a current image is performed by determining the similarity of the user's head or face with the model generated from the hypothesized silhouette based on a previous image. Silhouette tracking approaches can also be determined based on identifying the flow fields for each pixel inside the silhouette that is dominant over the entire silhouette.

FIG. 6 illustrates an example process 600 for providing a user interface based on tracking of an object, such as a user's head or face, in accordance with an embodiment. It should be understood that, for any process discussed herein, there can be additional, fewer, or alternative steps performed in similar or alternative orders, or in parallel, within the scope of the various embodiments unless otherwise stated. The process may be initiated by powering on a computing device if the process is performed on the device and a user interface of the device is configured to track a user's head or face (and/or facial features, such as a user's eyebrows, eyes, nose, mouth, etc.) to determine a particular view or perspective to display. In other embodiments, a user interface based on head or face tracking may be part of a user application, and the process can be initiated by starting up the user application. In still other embodiments, the process may be implemented as a remote server request and the process can be initiated by sending an appropriate request to the remote server. In this example, the process begins by detecting a representation of a user's head within one or more images using one or more cameras of a computing device. In those embodiments that employ multiple cameras, the first images can be pre-processed to generate a stereo disparity image or mapping to provide depth, disparity, or distance information.

A first position of the user's head can then be estimated based on where the representation of the user's head is detected in the first images 602. Depending on the application, the position of the user's head can be represented in various ways. In some embodiments, the first position can be represented as the raw pixel coordinates of the representation of the user's head detected in the first images. In other embodiments, the position of the user's head can be computed with respect to the computing device. For example, in one embodiment, a three-dimensional vector can be defined between a first point corresponding to the device, such as the center of a display screen of the device, and a second point corresponding to the user's head, such as a point between the user's eyes. Determining the position of the user's head can include computing the values of this vector as the user's head, face, and/or eyes move with respect to the device (or the device is moved with respect to the user).

In still other embodiments, more robust position information can be estimated by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated. Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, or the algorithm set forth in Zhang, Zhengyou. "A flexible new technique for camera calibration," *Pattern Analysis and Machine Intelligence, IEEE Transactions on* 22, no. 11 (2000): 1330-1334, each of which is incorporated herein by reference. In the case where the cameras are calibrated, the essential matrix can be computed instead of the fundamental matrix, and determining the camera matrices may be unnecessary.

Finding corresponding points between two images involves feature matching, which is discussed elsewhere herein. The fundamental matrix is a mapping from the two-dimensional projective plane of the first image to the pencil of epipolar lines corresponding to the second image. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known.

Triangulation computes the 3D point that project to each point correspondence between the two images. Approaches for triangulation include linear methods, the optimal triangulation method, among others. Rectifying the projective reconstruction to metric can be implemented directly, such as by computing the homography for five or more ground control points with known Euclidean positions. Another approach for rectifying the projective reconstruction is referred to as the stratified method, which may involve an affine reconstruction and a metric reconstruction.

One of ordinary skill in the art will appreciate that other embodiments may reconstruct 3D points from multiple 2D images, such as approaches based on calculating the trifocal tensor for three images or techniques based on the factorization algorithm or bundle adjustment for n images. These various approaches for reconstruction are discussed in Hartley, Richard et al. *Multiple view geometry in computer vision.* Vol. 2. Cambridge, 2000, which is hereby incorporated herein by reference.

The example process 600 may continue with the display of content that depends on the position of the head or face of the user 604. The content may include one or more 3D graphical elements projected onto a 2D display screen. Various techniques can be used to simulate three-dimensionality such as redrawing or rendering 3D projections of graphical elements according to the position of the user's head as in the examples of FIGS. 1C-1F and 2A-2D. Each of the graphical elements can additionally or alternatively include shadows, textural shades, and/or reflections that are rendered based on the user's position. Various other approaches for rendering a three-dimensional perspective of graphical elements for a two-dimensional display can also be implemented in various embodiments, and should be apparent in light of the teachings and suggestions contained herein.

After a first view of the content is rendered and displayed, motion of the device can be detected to determine whether the motion exceeds a threshold 508. Motion can be detected using one or more inertial sensors of the computing device, such as an accelerometer, gyroscope, magnetometer, or a combination thereof (e.g., inertial measurement unit (IMU)). Motion can also be determined using time of flight techniques based on various components, including light-based transceivers, ultrasonic transceivers, microwave transceivers, among others. In some embodiments, motion of the device can be estimated based on calculating motion of the device as the distance between locations of the device over time using components capable of providing geographical coordinates or other location information, such as a GPS component, cellular network component, a Bluetooth® component, a Wi-Fi component, an RF component, an NFC component, among others. In some embodiments, a device may also include a pedometer, speedometer, odometer, and the like, that is a discrete component from the aforementioned components. For example, such elements enable a user to track her progress during exercise (e.g., walking, running, bicycling, etc.). These elements can also be used for determining motion of the device in at least some embodiments. In some embodiments, motion can be determined by combining analyzing image data over a sequence of two or more images (e.g., using one or more cameras) with data from other input components, such as inertial sensors, location determination components, and the like.

In various embodiments, the motion of the device can be classified based on the data captured by the sensors and other input elements of the device for an interval of time, such as every 10 seconds, 30 seconds, minute, 5 minutes, etc. In one embodiment, the device can be categorized as being stationary, in steady motion (e.g., moving at uniform velocity), or in acceleration. For example, the device may be characterized as stationary if the device is resting on a non-moving object, such as a desk or table. On the other hand, the device may be characterized as in steady motion if the user is holding the device and the device is subject to hand tremor, the user is walking while operating the device, or the user is operating the device in an operating vehicle. The device may be characterized as in acceleration if the device is determined to be accelerating between intervals. It will be appreciated that other classification schemes can be used in various embodiments, such as a binary classification scheme (e.g., stationary or in motion), a classification scheme that includes more than two states of motion (e.g., further classifying "steady motion" and "in acceleration" according to the respective magnitude of the velocity and acceleration), a classification based on user activity (e.g., walking, running, in a vehicle, on a bus, on a boat, on a plane, etc.), among other possibilities.

When a device is stationary or substantially stationary (e.g., below a threshold), fast motions may be difficult for a human body to achieve and the effect of jitter corresponding to a user interface may be more pronounced and cause an unsatisfactory experience for some users. In an embodiment, when the device is determined to be stationary or substantially stationary, a tracking algorithm that is associated with a least amount of jitter or less jitter than other tracking algorithms can be selected to track the head or face of the user 610. Additionally, or alternatively, the parameters of the tracking algorithm can be modified to minimize jitter or decrease jitter with respect to other motion classifications. For example, certain tracking algorithms can be tuned to correspond to less jitter (but more latency) by sampling images at a more frequent rate. Conversely, a tracking algorithm can be altered to correspond to more jitter and less latency by sampling images at a less frequent rate.

When the device is determined to be in motion, the rate of the motion can be calculated 612. The rate of the motion can include velocity (e.g., linear velocity or rotational velocity) and acceleration (e.g., with respect to gravity). The rate of the motion can also be averaged over a motion determination interval. In an embodiment, a device can be characterized as in steady motion when the device is determined to be in one of multiple motion states, such as moving at a uniform velocity (i.e., no acceleration) or in acceleration. A tracking algorithm corresponding to an intermediate amount of jitter and/or latency can be selected for tracking the head of the user when the device is in steady motion and a tracking algorithm corresponding to a least amount of latency or less latency than other tracking algorithms can be selected for tracking the head of the user when the device is in acceleration 614. Alternatively, or in addition, parameters of a tracking algorithm for tracking the user's head can be modified based on one of these two states of motion. When the device is in acceleration, the parameters of the tracking algorithm can be selected such that head tracking corresponds to less latency (but more jitter) than when the device is stationary or in steady motion, and when the device is in steady motion, the parameters for the tracking algorithm can be selected such that head tracking corresponds to an intermediate amount of latency and/or jitter relative to when the device is stationary or in acceleration 616. The user's head can then be tracked using the selected algorithm and/or specified parameters 618. The position of the user can then be estimated from where the representation of the user's head or face is tracked between the first images and second images 620, using a similar approach as discussed with respect to 602, and a second view or perspective of the content can be displayed based on where the representation of the head or face of the user is tracked 622.

In some embodiments, a specific tracking algorithm and/or its parameters may always be determined whether or not the device is determined to be stationary or substantially stationary. For example, steps 608 and 610 can be skipped and a suitable tracking algorithm and its parameters can be selected based on a determination that a device is stationary or substantially stationary.

Figure 7:
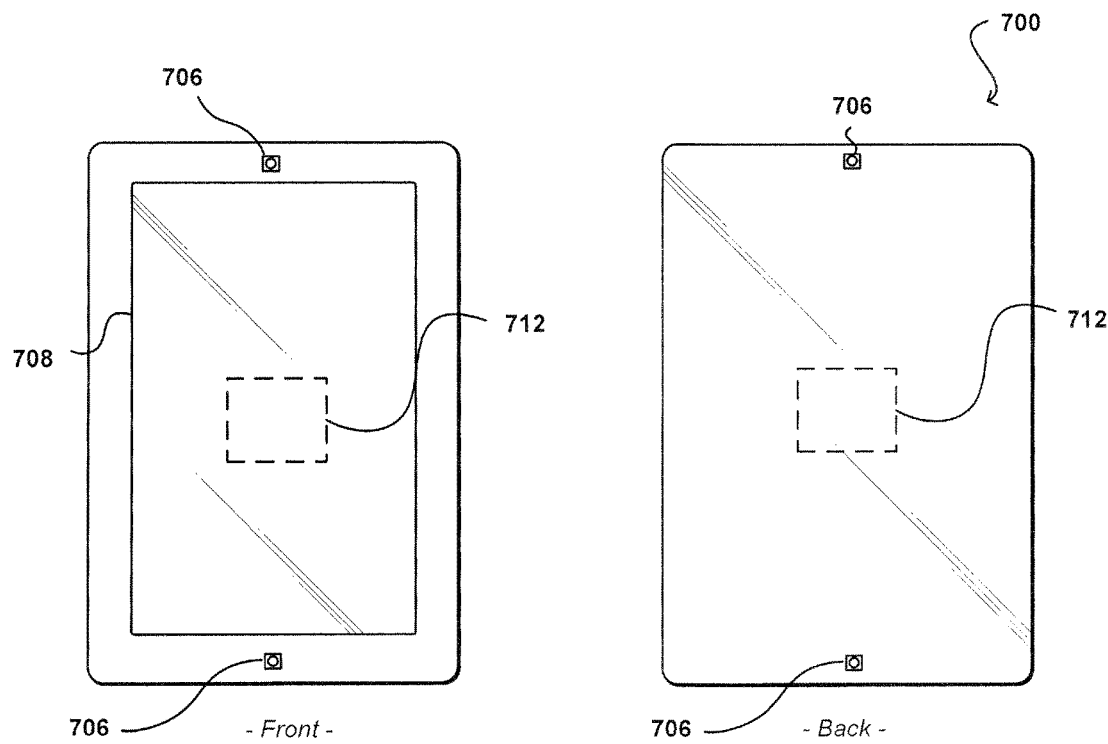
FIG. 7 illustrates an example of a computing device that can be used in accordance with various embodiments.

FIG. 7 illustrates an example computing device 700 that can be used to perform approaches described in accordance with various embodiments. In this example, the device includes two cameras 706 located at the top and bottom on each of a same and opposite side of the device as a display element 708, and enabling the device to capture images in accordance with various embodiments. The computing device also includes an inertial measurement unit (IMU) 712, comprising a three-axis gyroscope, three-axis accelerometer, and magnetometer that can be used to detect the motion and/or orientation of the device, and to facilitate head or face tracking in accordance with various embodiments. In other embodiments, the computing device may also (or instead) include a GPS component, a cellular network component, a Bluetooth® component, a Wi-Fi component, an RF component, an NFC component, a light-based transceiver, an ultrasonic transceiver, a pedometer, a speedometer, an odometer, among other possibilities.

Figure 8:
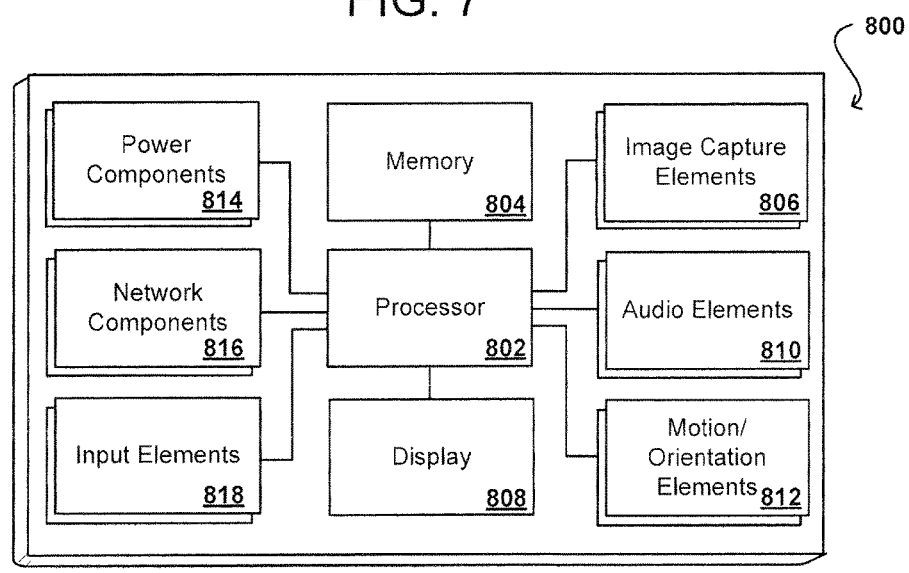
FIG. 8 illustrates an example configuration of components of a computing device such as that illustrated in FIG. 7.

FIG. 8 illustrates a logical arrangement of a set of general components of an example computing device 800 such as the device 800 described with respect to FIG. 8. In this example, the computing device includes a processor 802 for executing instructions that can be stored in a memory element 804. As would be apparent to one of ordinary skill in the art, the computing device can include many types of memory, data storage, or non-transitory computer-readable storage media, such as a first data storage for program instructions for execution by the processor 802, a separate storage for images or data, a removable memory for sharing information with other computing devices, etc. The computing device typically will include some type of display element 808, such as a touchscreen, electronic ink (e-ink), organic light emitting diode (OLED), liquid crystal display (LCD), etc., although computing devices such as portable media players might convey information via other means, such as through audio speakers. In at least some embodiments, the display screen provides for touch or swipe-based input using, for example, capacitive or resistive touch technology. As discussed, the computing device in many embodiments will include one or more cameras or image sensors 806 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the computing device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a computing device can include the ability to start and/or stop image capture, such as when receiving a command from a user, application, or other computing device. The example computing device can similarly include at least one audio component, such as a mono or stereo microphone or microphone array, operable to capture audio information from at least one primary direction. A microphone can be a uni- or omni-directional microphone as known for such components.

The computing device 800 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 814 known in the art for providing power to a computing device, which can include capacitive charging elements for use with a power pad or similar component. The computing device can include one or more communication elements or networking sub-systems 816, such as a Wi-Fi, Bluetooth, RF, wired, or wireless communication system. The computing device in many embodiments can communicate with a network, such as the Internet, and may be able to communicate with other such computing devices. In some embodiments the computing device can include at least one additional input component 818 able to receive conventional input from a user. This conventional input can include, for example, a push button, touch pad, touchscreen, wheel, joystick, keyboard, mouse, keypad, or any other such element whereby a user can input a command to the computing device. In some embodiments, however, such a computing device might not include any buttons at all, and might be controlled only through a combination of visual and audio commands, such that a user can control the device without having to be in contact with the computing device.

The computing device 800 also can include one or more orientation and/or motion determination sensors 812. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the computing device. The computing device can include other elements as well, such as may enable location determinations through triangulation or another such approach. These mechanisms can communicate with the processor 802, whereby the computing device can perform any of a number of actions described or suggested herein.

In some embodiments, the computing device 800 can include the ability to activate and/or deactivate detection and/or command modes, such as when receiving a command from a user or an application, or retrying to determine an audio input or video input, etc. For example, a computing device might not attempt to detect or communicate with other computing devices when there is not a user in the room. If a proximity sensor of the computing device, such as an IR sensor, detects a user entering the room, for instance, the computing device can activate a detection or control mode such that the computing device can be ready when needed by the user, but conserve power and resources when a user is not nearby.

In some embodiments, the computing device 800 may include a light-detecting element that is able to determine whether the computing device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the computing device. For example, if the computing device is unable to detect a user's view location and a user is not holding the computing device but the computing device is exposed to ambient light, the computing device might determine that it has likely been set down by the user and might turn off the display element and disable certain functionality. If the computing device is unable to detect a user's view location, a user is not holding the computing device and the computing device is further not exposed to ambient light, the computing device might determine that the computing device has been placed in a bag or other compartment that is likely inaccessible to the user and thus might turn off or disable additional features that might otherwise have been available. In some embodiments, a user must either be looking at the computing device, holding the computing device or have the computing device out in the light in order to activate certain functionality of the computing device. In other embodiments, the computing device may include a display element that can operate in different modes, such as reflective (for bright situations) and emissive (for dark situations). Based on the detected light, the computing device may change modes.

In some embodiments, the computing device 800 can disable features for reasons substantially unrelated to power savings. For example, the computing device can use voice recognition to determine people near the computing device, such as children, and can disable or enable features, such as Internet access or parental controls, based thereon. Further, the computing device can analyze recorded noise to attempt to determine an environment, such as whether the computing device is in a car or on a plane, and that determination can help to decide which features to enable/disable or which actions are taken based upon other inputs. If speech or voice recognition is used, words can be used as input, either directly spoken to the computing device or indirectly as picked up through conversation. For example, if the computing device determines that it is in a car, facing the user and detects a word such as "hungry" or "eat," then the computing device might turn on the display element and display information for nearby restaurants, etc. A user can have the option of turning off voice recording and conversation monitoring for privacy and other such purposes.

In some of the above examples, the actions taken by the computing device relate to deactivating certain functionality for purposes of reducing power consumption. It should be understood, however, that actions can correspond to other functions that can adjust similar and other potential issues with use of the computing device. For example, certain functions, such as requesting Web page content, searching for content on a hard drive and opening various applications, can take a certain amount of time to complete. For computing devices with limited resources, or that have heavy usage, a number of such operations occurring at the same time can cause the computing device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the computing device can have sufficient processing capability, and the camera and associated image analysis algorithm(s) may be sensitive enough to distinguish between the motion of the computing device, motion of a user's head, motion of the user's eyes and other such motions, based on the captured images alone. In other embodiments, such as where it may be desirable for an image process to utilize a fairly simple camera and image analysis approach, it can be desirable to include at least one motion and/or orientation determining element that is able to determine a current orientation of the computing device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a computing device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the computing device at a fixed orientation (e.g., distance, angle, etc.) to the user and the user changes orientation to the surrounding environment, analyzing an image of the user alone will not result in detecting a change in an orientation of the computing device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the computing device can determine that computing the device has changed orientation, even though the orientation of the computing device with respect to the user has not changed. In other embodiments, the computing device may detect that the user has moved with respect to the device and adjust accordingly. For example, if the user tilts their head to the left or right with respect to the computing device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These computing devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display device, printer or speaker). Such a system may also include one or more storage components, such as disk drives, optical storage components and solid-state storage components such as random access memory (RAM) or read-only memory (ROM), as well as removable media components, memory cards, flash cards, etc.

Such computing devices can also include a computer-readable storage media reader, a communications component (e.g., a modem, a network card (wireless or wired), an infrared communication element) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a display screen;
   one or more cameras;
   one or more inertial sensors; and
   memory including instructions that, when executed by the one or more processors, cause the computing device to:
      estimate a first position of a head with respect to the computing device based at least in part upon one or more first images captured by the one or more cameras;
      display a first view of content on the display screen based at least in part upon the first position of the head with respect to the computing device;
      obtain motion data, captured by the one or more inertial sensors, corresponding to motion of the computing device;
      determine, using the motion data, that the computing device is in motion;
      determine, using the motion data, one or more performance parameters for tracking the head in image data, the one or more performance parameters controlling an amount of latency with respect to display of the content, the one or more performance parameters including at least an image sampling rate;
      estimate a second position of the head with respect to the computing device based at least in part upon the one or more performance parameters, the first position of the head with respect to the computing device, and one or more second images captured by the one or more cameras; and
      display a second view of the content on the display screen based at least in part upon the second position of the head with respect to the computing device.

2. The computing device of claim 1, wherein the one or more performance parameters for tracking the head in image data correspond to:
   less jitter when the motion of the computing device is determined to be less than a threshold, and
   less latency when the motion of the computing device is determined to exceed the threshold.

3. The computing device of claim 1, wherein the instructions when executed further cause the computing device to:
   select a tracking process from a plurality of tracking processes to track the head, the plurality of tracking processes including at least one of feature point tracking, template matching, optical flow analysis, mean-shift tracking, Jepson tracking, principal component analysis (PCA), or support vector machines (SVM), the tracking process being selected based at least in part upon the motion data, wherein the instructions when executed to cause the computing device to estimate the second position of the head with respect to the computing device is further based at least in part upon the tracking process.

4. The computing device of claim 1, wherein:
   the first view of the content includes one or more graphical elements rendered according to a first three-dimensional perspective that is based at least in part upon the first position of the head; and
   the second view of the content includes the one or more graphical elements rendered according to a second three-dimensional perspective that is based at least in part upon the second position of the head.

5. A computer-implemented method for tracking an object, comprising:
   estimating a first position of an object relative to a computing device based at least in part upon one or more images;
   obtaining motion data corresponding to motion of the computing device;
   determining, based at least in part upon the motion data, that the computing device is in motion;
   determining at least one tracking algorithm for tracking the object in image data, the at least one tracking algorithm controlling an amount of latency with respect to a display of content, wherein the at least one tracking algorithm is selected from among a plurality of tracking algorithms, the plurality of tracking algorithms including at least two of feature point tracking, template matching, optical flow analysis, mean-shift tracking, Jepson tracking, principal component analysis (PCA), or support vector machines (SVM); and
   estimating a second position of the object relative to the computing device using the at least one tracking algorithm.

6. The computer-implemented method of claim 5, wherein determining the at least one tracking algorithm includes:
   determining one or more performance parameters for tracking the object based at least in part upon the motion data.

7. The computer-implemented method of claim 6, wherein the one or more performance parameters control jitter corresponding to the display of content and control the amount of latency corresponding to the display of content.

8. The computer-implemented method of claim 7, wherein the one or more performance parameters correspond to:
   less jitter when the motion data indicates a first state of motion of the computing device, and
   less latency when the motion data indicates a second state of the motion of the computing device.

9. The computer-implemented method of claim 5, wherein the object is a head, the method further comprising:
   estimating a first position of a head with respect to the computing device based at least in part upon the one or more images captured by one or more cameras; and
   estimating a second position of the head with respect to the computing device based at least in part upon a second one or more images captured by the one or more cameras, wherein tracking the object using the at least one tracking algorithm includes tracking the head between the one or more images and the second one or more images.

10. The computer-implemented method of claim 9, further comprising:
    causing to be displayed a first view of content rendered according to a first three-dimensional perspective that is based at least in part upon the first position of the head; and causing to be displayed a second view of the content rendered according to a second three-dimensional perspective that is based at least in part upon the second position of the head.

11. The computer-implemented method of claim 9, further comprising:
computing stereo disparity data for at least one of the first set of one or more images or the second set of one or more images, wherein estimating the second position of the head with respect to the computing device is further based at least in part upon the stereo disparity data.

12. The computer-implemented method of claim 9, wherein estimating the first position of the head includes:
determining a first plurality of points of the head represented in a first image of the one or more images corresponding to a second plurality of points of the head represented in a second image of the one or more images;
calculating a fundamental matrix or an essential matrix using the first plurality of points and the second plurality of points; and
calculating one or more three-dimensional points corresponding to the head by triangulation using a first camera matrix corresponding to a first camera used to capture the first image, a second camera matrix corresponding to a second camera used to capture the second image, the first plurality of points, and the second plurality of points.

13. The computer-implemented method of claim 5, wherein the motion data is obtained from a sensor of the computing device.

14. A non-transitory computer-readable storage medium storing instructions that, when executed by one or more processors of a computing device, cause the computing device to:
estimate a first position of an object relative to a computing device based at least in part upon one or more images;
obtain motion data corresponding to motion of the computing device;
determine, based at least in part upon the motion data, that the computing device is in motion;
determining at least one tracking algorithm for tracking the object in image data, the at least one tracking algorithm controlling an amount of latency with respect to a display of content, wherein the determining further comprises determining one or more performance parameters for tracking the object based at least in part upon the motion data, the one or more performance parameters including at least an image sampling rate; and
estimate a second position of the object relative to the computing device using the at least one tracking algorithm.

15. The non-transitory computer-readable storage medium of claim 14, wherein the instructions when executed to cause the computing device to determine the at least one tracking algorithm include causing the computing device to:
select, based at least in part upon the motion data, the at least one tracking algorithm from among a plurality of tracking algorithms, the plurality of tracking algorithms including at least one of feature point tracking, template matching, optical flow analysis, mean-shift tracking, Jepson tracking, principal component analysis (PCA), or support vector machines (SVM).

16. The non-transitory computer-readable storage medium of claim 14, wherein the instructions when executed to cause the computing device to determine the at least one tracking algorithm include causing the computing device to:
determine one or more performance parameters for tracking the object, the one or more performance parameters controlling jitter corresponding to the display of content and controlling the amount of latency corresponding to the display of content.

17. The non-transitory computer-readable storage medium of claim 14, wherein the instructions when executed to cause the computing to estimate the first position of the object include causing the computing device to:
determine a first plurality of points of the object represented in a first image of the one or more images corresponding to a second plurality of points of the object represented in a second image of the one or more images;
calculate a fundamental matrix or an essential matrix using the first plurality of points and the second plurality of points; and
calculate one or more three-dimensional points corresponding to the object by triangulation using a first camera matrix corresponding to a first camera used to capture the first image, a second camera matrix corresponding to a second camera used to capture the second image, the first plurality of points, and the second plurality of points.

18. The non-transitory computer-readable storage medium of claim 17, wherein the object is a head, and the instructions when executed further cause the computing device to:
cause to be displayed a first view of content rendered according to a first three-dimensional perspective that is based at least in part upon the first position of the head; and
cause to be displayed a second view of the content rendered according to a second three-dimensional perspective that is based at least in part upon the second position of the head.

19. The computer-implemented method of claim 5, further comprising:
obtaining second motion data corresponding to motion of the computing device;
determining, based at least in part upon the second motion data, that the computing device is in a stationary position;
determining a second tracking algorithm for tracking the object, the second tracking algorithm controlling an amount of jitter with respect to the display of content; and
estimating a third position of the object relative to the computing device using the second tracking algorithm.

20. The non-transitory computer-readable storage medium of claim 14, wherein the instructions when executed further cause the computing device to:
obtain second motion data corresponding to motion of the computing device;
determine, based at least in part upon the second motion data, that the computing device is in a stationary position;
determine a second tracking algorithm for tracking the object, the second tracking algorithm controlling an amount of jitter with respect to the display of content; and estimate a third position of the object relative to the computing device using the second tracking algorithm.

21. A computer-implemented method for tracking an object, comprising:

estimating a first position of an object relative to a computing device based at least in part upon one or more images;

obtaining motion data corresponding to motion of the computing device;

determining, based at least in part upon the motion data, that the computing device is in motion;

dynamically adjusting, based on the motion data, one or more performance parameters of at least one tracking algorithm for tracking the object in image data, the one or more parameters controlling an amount of latency with respect to a display of content; and estimating a second position of the object relative to the computing device using the at least one tracking algorithm.

* * * * *